Figure 1A:
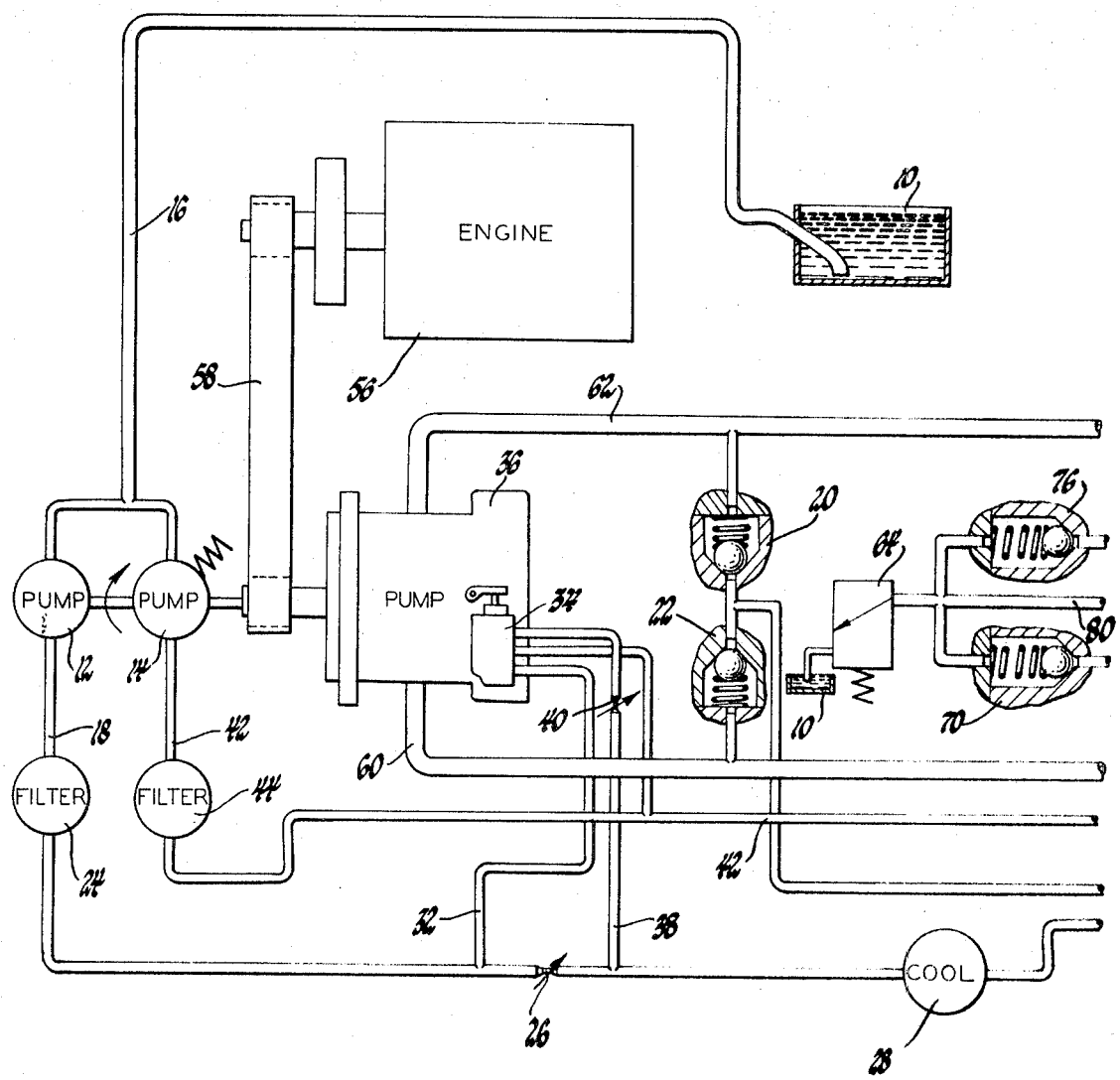

United States Patent

[11] 3,627,070

[72] Inventor Robert B. Colten
  Santa Barbara, Calif.
[21] Appl. No. 33,256
[22] Filed Apr. 30, 1970
[45] Patented Dec. 14, 1971
[73] Assignee General Motors Corporation
  Detroit, Mich.

[54] HYDROSTATIC TRANSMISSION FOR STEER BY DRIVING VEHICLES
  7 Claims, 2 Drawing Figs.

[52] U.S. Cl. .................................. 180/6.48,
  60/52 S, 60/53 R
[51] Int. Cl. .................................. B62d 11/04
[50] Field of Search ........................... 180/6.3,
  6.48; 60/19, 52 S, 53 R

[56] References Cited
  UNITED STATES PATENTS

| | | | |
|---|---|---|---|
| 3,256,950 | 6/1966 | De Biasi | 180/6.48 X |
| 3,363,709 | 1/1968 | Hukerikar | 180/6.48 |
| 3,114,424 | 12/1963 | Voreau et al. | 180/6.3 |
| 3,177,964 | 4/1965 | Anderson | 60/53 X |
| 3,285,000 | 11/1966 | Christenson et al. | 60/19 |
| 3,306,385 | 2/1967 | Kempson | 180/6.48 |
| 2,255,787 | 9/1941 | Kendrick | 60/53 X |
| 3,246,471 | 4/1966 | Goodale | 60/19 X |

Primary Examiner—Leo Friaglia
Assistant Examiner—Leslie J. Paperner
Attorneys—W. E. Finken, A. M. Heiter and D. F. Scherer ABSTRACT: A fluid transmission having a pump and a pair of fluid motors for driving and steering a vehicle. Pump displacement is varied to control speed at low speeds. The displacement of both motors is concurrently varied to control speed at high speeds and direction at all speeds. The displacement of the fluid motors is independently varied for steering. The displacement of the pump and the motors is controlled by a fluid pressure control having a plurality of variable restrictions, two restrictions being varied by the vehicle steering mechanism to provide a torque differential between the motors and two other restrictions being varied by a manual control to control vehicle speed and direction. A directional valve responsive to drive system pressure acts in combination with the steer restrictions for proper steer control during coasting. A second directional valve responsive to the manual control provides forward or reverse steer control.

INVENTOR.
Robert B. Colten
Donald F. Scherer
ATTORNEY

HYDROSTATIC TRANSMISSION FOR STEER BY DRIVING VEHICLES

This invention relates to fluid transmissions and more particularly to fluid transmissions for use with a drive by steering vehicle. Previously known fluid transmissions providing a drive by steer function generally incorporated either two pumps each of which supplied fluid to a motor or a single pump dual motor system with a flow divider valve to control fluid flow to the motors. In a dual pump system the pump displacements are controlled to provide a speed differential between the drive motors for steering. This type of system generally requires an elaborate control system to control the pump displacements. In a transmission using a single pump and dual motors with a flow divider valve, large power losses quite often develop in the system due to the pressure drop required to operate the flow divider valve especially during steering.

The present invention incorporates a single variable displacement pump and two variable displacement motors connected in parallel with the pump. The motor displacements are controlled by a separate control system to eliminate power losses in the drive system. The motor control system responds to the vehicle steer mechanism to produce changes in the motor displacement. Since the motors are connected in parallel with the pump, they operate at a single pressure level. However, due to the displacement differential between the motors, they operate at a torque differential. Therefore, during a steer maneuver the motor having the higher displacement will produce a higher torque to the ground-engaging wheel or track which will result in a higher speed at that wheel or track thereby causing the vehicle to turn. During this steer maneuver, the total pump flow and pressure is utilized completely between the motors so that no power loss is present.

The displacement of the motors is controlled by a servo which responds to fluid pressure in a control system. The control system includes a pair of variable orifices which are adjustable to control the pressure on the servocontrol and thereby control the motor displacement. During a steer maneuver one of the variable restrictions is open while the other is closed so that the one motor increases in displacement while the other decreases. During coasting however the steer function of the motor is reversed. To compensate for this reversal of function, a valve member disposed between the variable restrictions and the motor servos responds to fluid pressure in the power system to change the connection between the variable restrictions and servocontrols. This permits the operator to demand the same steer function from the transmission during forward drive and forward coast.

The motors are changed from a positive displacement to a negative displacement for reverse drive of the vehicle. Therefore, to accomplish steering during reverse operation, a second valve means is included in the control system between the variable restrictions and the motor servos. This valve also causes a change in the fluid connections between the variable restrictions and the motor servos so that the operator can demand the same steer maneuver, i.e. a right turn and both a forward and reverse direction of vehicle movement with the same movement of the steer mechanism, i.e. clockwise turning of the steering wheel. The valve discussed above for operation during forward coasting is also effective during reverse coasting.

It is, therefore, an object of this invention to provide a power transmission in which the displacement of the fluid motors of the transmission are controlled by servos which respond to movement of the steer mechanism to provide a torque differential between the drive motors to effect vehicle turning.

It is another object of this invention to provide in an improved fluid power transmission a pair of servo-controlled variable displacement fluid motors which respond to a pair of variable steering mechanism-controlled orifices to effect steering and a valve member to interchange the effect of the variable orifices during coast driving.

Another object of this invention is to provide an improved fluid power transmission having a variable displacement pump and a pair of variable displacement motors which motors are controlled by a first pair of variable restrictions to produce displacement changes in the motors for steering and a second pair of variable restrictions which control the motor displacements to effect an increase in vehicle speed.

Figure 1B:
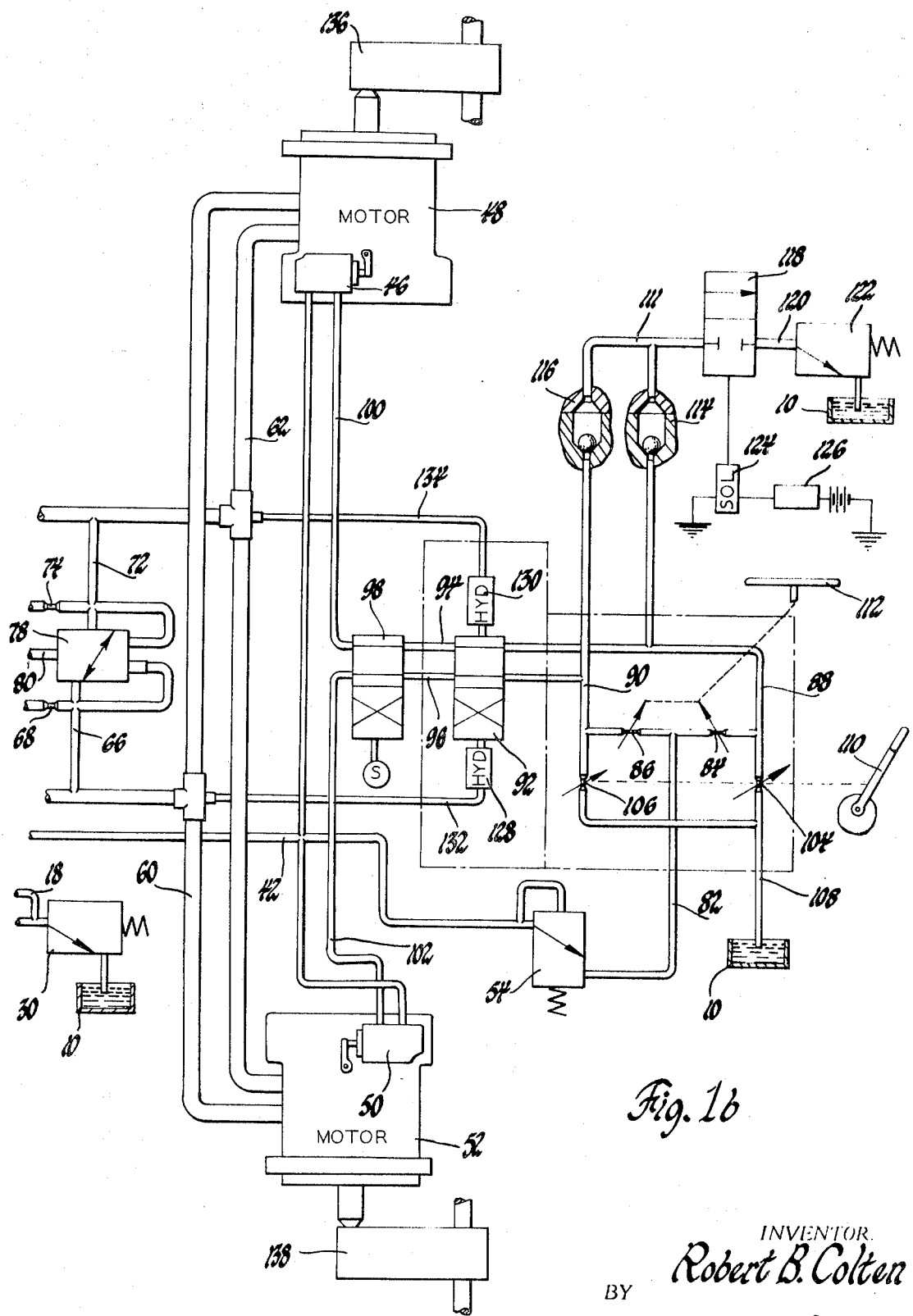

These and other objects and advantages of the present invention will be more apparent from the following description and drawings in which:

FIGS. 1a and 1b are a schematic representation of the transmission.

Referring to the drawings there is shown in FIGS. 1a and 1b a reservoir 10 in fluid communication with a supercharge pump 12 and a control pump 14 via an inlet passage 16. The supercharge pump 12 delivers fluid via a passage 18 to a pair of check valves 20 and 22 through a filter 24, a variable restriction 26 a cooler 28. The pressure in passage 18 is controlled by a conventional relief valve 30. A branch passage 32 delivers fluid pressure from the upstream side of variable restriction 26 to a pump servo 34 which controls the displacement of a fluid drive pump 36. The fluid drive pump 36 is a conventional axial piston or bent axis piston pump that is spring biased toward the neutral or zero displacement position. The servo 34 controls the displacement of pump 36 in response to a reference pressure, a command pressure and a control pressure. As command pressure increases, pump displacement increases. A passage 38 delivers fluid pressure from passage 18 downstream of the variable restriction 26 through an adjustable orifice 40 to the pump servo 34.

The control pump 14 delivers fluid to a passage 42 which is connected through a filter 44 to the pump servo 34, a servocontrol 46 for a fluid drive motor 48 and a servocontrol 50 for a fluid drive motor 52. The fluid pressure in passage 42 is controlled by a conventional relief valve 54.

The pumps 12, 14 and 36 are driven by an engine 56 through a chain drive 58. The pump 36 is in fluid communication with the fluid drive motors 48 and 52 through a pair of passages 60 and 62 which provide a fluid power circuit for the transmission. The fluid drive motors 48 and 52 are conventional axial piston or bent axis piston motors that are spring biased toward the positive or forward drive position. The servos 46 and 50, in response to increasing command signals and control pressure in passage 42, cause the motors 48 and 52 to move toward the neutral or zero-displacement position. When maximum command pressure is available, the motors 48 and 52 will be positioned in the maximum negative displacement. The check valves 20 and 22 permit makeup oil to be introduced into the power circuit via passages 60 and 62 respectively depending upon which of the passages 60 or 62 is operating at the low pressure or return passage for the power circuit. The pressure in passages 60 and 62 will vary depending upon whether the vehicle is supplying power to the ground during a driving mode or absorbing power from the ground during a coasting mode. The passage 62 is the high-pressure passage during the driving mode while the passage 60 is the high-pressure passage during the coasting mode. The high-pressure limit in the power circuits 60 and 62 is controlled by a relief valve 64 which is connected with passage 60 by a passage 66 which directs fluid through a restriction 68 and a check valve 70. The relief valve 64 is connected with passage 62 by a passage 72 which directs fluid pressure through a restriction 74 and a check valve 76. The passages 72 and 66 are also connected with a bypass valve 78 which is also connected with the relief valve 64 through a passage 80. When the relief valve 64 functions to limit the high pressure the pressure drop across restriction 68 or 74 will create a pressure differential on the bypass valve 78 and thereby causing the bypass valve to open a connection between passages 60 and 62 via passages 72 and 66. The bypass valve 78 functions to permit an interchange of fluid between passages 60 and 62 when the relief valve 64 is operating so that excessive makeup fluid will not have to be supplied from the supercharge pump 12 through the check valves 20 or 22.

The relief valve 54 has its discharge port connected with a passage 82 which directs fluid through a pair of variable restrictions 84 and 86 to a pair of control passages 88 and 90 respectively. The control passages 88 and 90 are connected through directional valve 92 to passages 94 and 96, which are connected with a directional valve 98 which directs fluid to passages 100 and 102 which are in fluid communication with the motor servos 46 and 50 respectively. The passages 88 and 90 are in fluid communication with the reservoir 10 through variable restrictions 104 and 106 respectively and passage 108. The restrictions 104 and 106 are controlled by a manual speed and direction control 110 which is movable to low, intermediate and high forward positions and a reverse position. The control 110 is also connected with the directional valve 98 by a linkage, not shown. The variable restrictions 84 and 86 are controlled by a vehicle steer mechanism 112 which mechanism controls the restrictions 84 and 86 in opposite directions in response to a steer command signal by the operator. The passages 88 and 90 are connected through check valves 114 and 116 respectively to a passage 111 which is connected with a solenoid-controlled directional valve 118 which is in fluid communication through passage 120 with a relief valve 122. The directional valve 118 is controlled by a solenoid 124 which is operatively connected with the vehicle battery through a vacuum switch 126. The vacuum switch 126 is connected to the engine manifold and responds to the vacuum therein so that the switch is open at low vacuums, such as occur during normal driving, and closed at high vacuums, such as occur at engine idle. When the vacuum switch 126 is open the directional valve 118 is in the position shown thereby permitting the maximum command pressure in passages 88 and 90 to be controlled by the variable restrictions 84, 86, 104 and 106. When the vacuum switch 126 is closed the command signal passages 88 and 90 will be connected through the directional valve 118 to the regulator valve 122. At this time the maximum command pressure in passages 88 and 90 is controlled by the setting of the regulator valve 122. The pressure setting of the regulator valve 122 is such that the motors 48 and 52 will not be permitted to achieve maximum negative displacement. Thus a true pivot steer cannot be achieved at idle or low throttle setting during coasting since under coasting conditions a short circuit in the hydraulic circuit will occur. However, during engine-driving conditions the short circuit in the hydraulic system does not occur therefore the regulator 122 is effectively removed from the system when the engine is driving, to permit the full pivot steer under normal driving conditions.

The directional valve 92 is a pilot-operated directional valve having hydraulic pilots 128 ad 130 at either end of the valve which are connected to passages 132 and 134 respectively. The passage 132 is in fluid communication with passage 60 of the power circuit such that whenever passage 60 is pressurized, such as during coasting, the directional valve 92 will be positioned to connect passage 88 with passage 96 and passage 90 with passage 94. The passage 134 is connected with passage 62 of the power circuit such that whenever passage 62 is pressurized the directional valve 92 will be in the position shown thereby connecting passage 88 with passage 94 and passage 90 with passage 96.

During operation the pump 34 is driven by the engine 52 to deliver fluid pressure to passage 62. The displacement of the pump 36 as previously mentioned is controlled by the servocontrol 34. The servocontrol 34 receives a reference signal via passage 32 upstream of the restriction 26 and a command signal via passage 38 downstream of the variable restriction 26. The variable restriction 26 is controlled by the vehicle throttle and vehicle brake such that at idle or when the brake is applied the restriction 26 is open so that the reference signal in passage 32 and the command signal in passage 38 are equal and the pump will assume its neutral position. The restriction 40 permits adjustment of the neutral position. However, when the brake is disengaged and the vehicle throttle is depressed, the restriction 26 will begin to close thereby creating a pressure differential between passages 32 and 38 so that the servo valve will open permitting control pressure in passage 42 to cause the pump 36 to assume a positive displacement so that fluid pressure will be delivered to passage 62.

The pressure in passage 62 is directed to the fluid drive motors 48 and 52 to cause them to rotate in a forward direction provided the manual control 110 is in one of the forward positions and the steer mechanism 112 is in the neutral or no steer position. As the vehicle throttle is depressed towards the full throttle position, the pump 36 will be positioned toward full displacement thereby increasing the speed of motors 48 and 52. At full throttle conditions the pump 36 will be at maximum displacement such that further speed increase can only be achieved by reducing the displacement of the motors 48 and 52. The displacement change from maximum toward minimum is controlled by the manual lever 110 such that as the manual lever is moved from the low-drive position to the intermediate drive position the restrictions 104 and 106 will be moved toward a closed position thereby increasing the command pressure in passages 88 and 90 which will open the servo valves 46 and 50 to permit control pressure in passage 42 to cause the motors 48 and 52 to have a displacement change from maximum toward minimum resulting in a speed increase of the vehicle. The lever 110 can be moved to the high-forward drive position thereby further reducing the displacement of motors 48 and 52 as described above so that maximum vehicle speed can be attained. The manual lever 110 can be moved to the low intermediate or high position regardless of the displacement of the pump 36. Therefore the minimum positive or forward drive displacement and maximum output speed of the motors 48 and 52 can be achieved at intermediate throttle settings.

To steer the vehicle during forward driving, the operator rotates the steering wheel 112 either clockwise or counterclockwise to achieve the desired steer maneuver. For example, to achieve a left turn the steering mechanism 112 is rotated counterclockwise thereby providing less opening in the variable restriction 84 while providing more opening in the variable restriction 86. As restriction 84 is closed the command pressure in passage 88 will decrease thereby permitting the motor 48 to assume an increased displacement while the restriction 86 upon opening causes the pressure in passage 90 to increase thereby reducing the displacement of drive motor 52. Since the fluid pressure to the drive motors 48 and 52 is equal, the drive motor 48 will produce more torque than the drive motor 52 due to its higher displacement value. The motor 48 will therefore rotate more rapidly due to the higher torque output causing the vehicle to steer to the left. If the driver desires to steer to the right, the steer mechanism 112 is moved in the opposite direction which will produce an increase in the displacement of motor 52 and a decrease in the displacement of motor 48 which will result in a speed increase of motor 52 thereby producing a right turn.

During coasting of the vehicle, the motors 48 and 52 are driven through the vehicle final drives 136 and 138 respectively which are driven by the driving wheels or driving track not shown. When the motors 48 and 52 are driven during coasting they operate as pumps and deliver fluid to passage 60 which is connected to the pump 36. When the vehicle is in a coasting condition the pump 36 will be at minimum or zero displacement thereby creating a resistance to fluid flow in passage 60 so that pressure will develop in the units 48 and 52 to permit them to absorb torque from the ground-engaging devices. As the pressure is developed in passage 60, the directional valve 92 will be shifted by the hydraulic pilot 128 to interchange the connections between passages 88 and 90 and the servos 46 and 40. This interchange of connections is made so that the vehicle operator can achieve a left or right turn with the same maneuver of the steer mechanism as is used during forward driving for a left or right turn. Therefore during coasting, to achieve a right turn, the operator rotates the steering mechanism 112 clockwise thereby providing more opening in the restriction 84 while providing less opening in restriction 86. The opening of restriction 84 permits an increase in command pressure in the passage 88 which is directed through directional valve 92 to passage 96 and through directional valve 98 to passage 102 to cause a decrease in the displacement motor 52. The closing or restriction 86 will cause the command pressure in passage 90 to decrease so that an increase in the displacement of motor 48 will be occasioned. As the displacement of motor 48 increases, the motor will be capable of absorbing more torque which will result in a speed decrease of the motor 48 while the motor 52 will be capable of absorbing less torque to its displacement decrease thereby permitting a speed increase of motor 52 so that a right turn will be accomplished.

To drive the vehicle in reverse, the manual lever 110 is moved to the reverse position thereby placing the variable restrictions 104 and 106 in their minimum opening position while also moving the directional valve 98 to provide fluid communication between passage 94 and passage 102 and between passage 96 and passage 100. The minimum setting of restrictions 104 and 106 produces sufficient command pressure in passages 88 and 90 to control the fluid motors 48 and 52 at their negative or reverse drive displacements. The directional valve 98 is shifted at this time so that the steering maneuvers requested by the operator in reverse will be identical to the steer maneuvers requested for a forward drive. Therefore, if a right turn in reverse is desired, the operator will rotate the steering mechanism 112 clockwise thereby opening restriction 84 while closing restriction 86. Opening of restriction 84 permits an increase in command pressure in passage 88 which is directed via directional valves 92 and 98 to passage 102 and servo 50. If the motor 52 is not at maximum negative displacement at this time, the increase in command pressure will cause the displacement to increase in a negative direction. The closing of restriction 86 produces a decrease in command pressure in passage 90 which is directed via directional valves 93 and 98 to passage 100 and the servocontrol 46. This decrease in command pressure will cause the motor 48 to reduce in negative displacement and torque capacity. With the displacement differential between the motors 48 and 52 as explained above, the motor 52 will produce a higher output torque and therefore a higher speed to cause the vehicle to turn to the right in reverse. The directional valve 92 functions during coasting in reverse in a manner similar to that explained above for forward coasting so that the steer control functions of variable restrictions 84 and 86 will interchange during coasting.

Obviously many modifications and variations of the present invention are possible in light of the above teachings. It is, therefore, to be understood that within the scope of the appended claims the invention may be practiced otherwise than as specifically described.

What is claimed is:

1. In a vehicle having a power source, drive means, a steering mechanism and a power transmission operatively connected between the power source and the drive means; fluid pump means operatively connected to the power source for providing fluid pressure; a pair of variable displacement fluid motor means in fluid communication with said fluid pump means for providing power to the drive means; displacement control means for each of said fluid motors for controlling the displacement thereof; and vehicle steer control means including fluid pressure means for supplying fluid pressure, and restriction control means including restriction means in fluid communication with said fluid pressure means and said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning.

2. In a vehicle having a power source, drive means, a steering mechanism and a power transmission operatively connected between the power source and the drive means; fluid pump means operatively connected to the power source for providing fluid pressure; a pair of variable displacement fluid motor means in fluid communication with said fluid pump means for providing power means to the drive means; displacement control means for each of said fluid motors for controlling the displacement thereof; and vehicle speed and steer control means including fluid pressure means for supplying fluid pressure, restriction control means including restriction means in fluid communication with said fluid pressure means and said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning, and speed control means in fluid communication with said fluid pressure source for controlling the displacement of said fluid motors in equal unidirectional amounts thereby controlling vehicle speed.

3. In a vehicle having a power source, drive means, a steering mechanism and a power transmission operatively connected between the power source and the drive means; fluid pump means operatively connected to the power source for providing fluid pressure; a pair of variable displacement fluid motor means in fluid communication with said fluid pump means for providing power to the drive means; displacement control means for each of said fluid motors for controlling the displacement thereof; and vehicle steer control means including fluid pressure means for supplying fluid pressure, restriction control means including restriction means in fluid communication with said fluid pressure means and said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning, and vacuum control means operatively connected with the power source and said restriction means for controlling the maximum control pressure delivered to said displacement control means.

4. In a vehicle having a power source, drive means, a steering mechanism and a power transmission operatively connected between the power source and the drive means; fluid pump means operatively connected to the power source for providing fluid pressure; a pair of variable displacement fluid motor means in fluid communication with said fluid pump means for providing power to the drive means; displacement control means for each of said fluid motors for controlling the displacement thereof; and vehicle steer control means including fluid pressure means for supplying fluid pressure, restriction control means including restriction means in fluid communication with said fluid pressure means and each of said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning, and valve means for interchanging the fluid communication between said restriction means and said displacement control means driving vehicle coasting.

5. In a vehicle having a power source, drive means, a steering mechanism and power transmission means operatively connected between the power source and the drive means for providing forward and reverse drives; fluid pump means operatively connected to the power source for providing fluid pressure; a pair of variable displacement fluid motors means in fluid communication with said fluid pump means for providing power to the drive means; displacement control means for each of said fluid motors for controlling the displacement thereof; and vehicle speed and steer control means including fluid pressure means for supplying fluid pressure, restriction control means including restriction means in fluid communication with said fluid pressure means and each of said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning, coast valve means intermediate said restriction means and said displacement control means for interchanging the fluid communication therebetween during vehicle coasting, direction control valve means in series with said coast valve means for interchanging fluid communication between said restriction means and said displacement control means during reverse driving, and speed control means in fluid communication with said fluid pressure source for controlling the displacement of said fluid motors in equal unidirectional amounts thereby controlling vehicle speed.

6. In a vehicle having a power source with a vacuum source, drive means, a steering mechanism and a power transmission means operatively connected between the power source and the drive means for providing forward and reverse drives; fluid pump means operatively connected to the power source for providing fluid pressure; a pair of variable displacement fluid motor means in fluid communication with said fluid pump means for providing power to the drive means; displacement control means for each of said fluid motors for controlling the displacement thereof; and vehicle speed and steer control means including fluid pressure means for supplying fluid pressure, restriction control means including restriction means in fluid communication with said fluid pressure means and said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning, coast valve means intermediate said restriction means and said displacement control means for interchanging the fluid communication therebetween during vehicle coasting, direction control valve means in series with said coast valve means for interchanging fluid communication between said restriction means and said displacement control means during reverse driving, speed control means in fluid communication with said fluid pressure source for controlling the displacement of said fluid motors in equal unidirectional amounts thereby controlling vehicle speed, and vacuum control means operatively connected to the vacuum source and said restriction means for controlling the maximum control pressure delivered to said displacement control means during vehicle coasting.

7. A power transmission for use with a vehicle comprising a power source; a steering mechanism; fluid pump means operatively connected to said power source for providing fluid pressure; a pair of variable displacement fluid motor means in fluid communication with said fluid pump means for providing output power; displacement control means for each of said fluid motors for controlling the displacement thereof; and steer control means including fluid pressure means for supplying fluid pressure, and restriction control means including restriction means in fluid communication with said fluid pressure means and said displacement control means and operatively connected with the steering mechanism for controlling variable pressure delivery to said displacement control means to control the displacement and torque capacity of said fluid motors in opposite amounts in response to movement of the steering mechanism thereby controlling vehicle turning.

* * * * *

PO-1050
(5/69)

UNITED STATES PATENT OFFICE
CERTIFICATE OF CORRECTION

Patent No. __3,627,070__ Dated __December 14, 1971__

Inventor(s) __Robert B. Colten__

It is certified that error appears in the above-identified patent and that said Letters Patent are hereby corrected as shown below:

Column 3, line 39, delete "and" and insert -- or -- ;
         line 45, after regulator insert -- valve -- ;

Column 4, line 68, delete "40" and insert -- 50 -- ;

Column 5, line 4, delete "or" and insert -- of -- ;
         line 10, after torque insert -- due -- ;
         line 36, delete "93" and insert -- 92 -- ;

Column 6, line 3, after power delete "means" ;
         line 61, delete "driving" and insert -- during --;

Signed and sealed this 15th day of August 1972.

(SEAL)
Attest:

EDWARD M. FLETCHER, JR.
Attesting Officer

ROBERT GOTTSCHALK
Commissioner of Patents